US011165636B2

(12) United States Patent
Hooda et al.

(10) Patent No.: US 11,165,636 B2
(45) Date of Patent: Nov. 2, 2021

(54) SYSTEMS AND METHODS FOR ENTERPRISE FABRIC CREATION

(71) Applicant: Cisco Technology, Inc., San Jose, CA (US)

(72) Inventors: Sanjay Kumar Hooda, Pleasanton, CA (US); Atri Indiresan, Sunnyvale, CA (US); Jerish Sam David, Fremont, CA (US); Anand Pulicat Gopalakrishnan, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 28 days.

(21) Appl. No.: 16/203,949

(22) Filed: Nov. 29, 2018

(65) Prior Publication Data
US 2020/0177447 A1 Jun. 4, 2020

(51) Int. Cl.
*H04L 12/24* (2006.01)
*H04L 12/933* (2013.01)
*H04L 12/751* (2013.01)

(52) U.S. Cl.
CPC ...... *H04L 41/0806* (2013.01); *H04L 41/0886* (2013.01); *H04L 41/0893* (2013.01); *H04L 45/02* (2013.01); *H04L 49/10* (2013.01)

(58) Field of Classification Search
CPC ............ H04L 41/0806; H04L 41/0886; H04L 41/0893; H04L 45/02; H04L 49/10
See application file for complete search history.

(56) References Cited

U.S. PATENT DOCUMENTS

| 5,751,967 | A | * | 5/1998 | Raab | ................... | H04L 41/0893 709/220 |
| 6,516,345 | B1 | * | 2/2003 | Kracht | ................ | H04L 41/0213 370/254 |
| 6,636,499 | B1 | * | 10/2003 | Dowling | ............. | H04L 12/4625 370/338 |
| 7,417,950 | B2 | * | 8/2008 | Hofmeister | ......... | H04L 12/4633 370/230 |
| 7,567,523 | B2 | * | 7/2009 | Black | .................... | H04L 12/462 370/255 |

(Continued)

OTHER PUBLICATIONS

Lu, HybNET network manager for a hybrid network infrastructure, Dec. 2013, ACM digital library, pp. 1-6 (Year: 2013).*

*Primary Examiner* — John A Follansbee
*Assistant Examiner* — Fadi Haj Said
(74) *Attorney, Agent, or Firm* — Merchant & Gould P.C.

(57) ABSTRACT

In one embodiment, a method is performed at a controller of a fabric that is connected to a first seed device in the fabric. The method includes obtaining a connectivity graph of the fabric including the first seed device. The method further includes causing the first seed device to send a first request to a first neighboring device in the connectivity graph via a first interface of the first seed device connectable to the first neighboring device. The method also includes assigning fabric component properties to devices in the fabric based at least in part on a first message from the first seed device, where the first seed device generates the first message based at least in part on a first response from the first neighboring device received via the first interface. The method additionally includes converting the first neighboring device to a second seed device in the fabric.

20 Claims, 7 Drawing Sheets

(56) References Cited

U.S. PATENT DOCUMENTS

| | | | | |
|---|---|---|---|---|
| 7,817,541 | B2* | 10/2010 | Gray | H04L 12/4625 370/220 |
| 7,848,245 | B1* | 12/2010 | Krishnamurthy | H04L 43/0817 370/244 |
| 8,244,249 | B1* | 8/2012 | Everson | H04W 84/18 370/331 |
| 8,260,840 | B1* | 9/2012 | Sirota | G06F 9/5061 370/216 |
| 8,711,855 | B1* | 4/2014 | Murphy | H04L 12/28 370/390 |
| 8,752,160 | B1* | 6/2014 | Delker | H04L 41/0893 370/252 |
| 8,918,631 | B1* | 12/2014 | Kumar | H04L 12/4641 370/254 |
| 9,166,878 | B1* | 10/2015 | Cook | H04L 41/08 |
| 9,667,485 | B2* | 5/2017 | Murphy | H04W 12/06 |
| 10,120,725 | B2* | 11/2018 | Jubran | G06Q 10/087 |
| 2002/0161933 | A1* | 10/2002 | Shanthaveeraiah | H04L 41/12 719/328 |
| 2003/0046390 | A1* | 3/2003 | Ball | H04L 41/12 709/224 |
| 2004/0022257 | A1* | 2/2004 | Green | H04L 12/4641 370/401 |
| 2006/0133299 | A1* | 6/2006 | Son | H04L 41/12 370/254 |
| 2007/0076591 | A1* | 4/2007 | Khan | H04L 12/4625 370/216 |
| 2007/0217415 | A1* | 9/2007 | Wijnands | H04L 12/1836 370/390 |
| 2010/0142403 | A1* | 6/2010 | Baumgarth | H04L 41/0806 370/254 |
| 2011/0301805 | A1* | 12/2011 | Avian | H04L 12/40032 701/32.7 |
| 2012/0051589 | A1* | 3/2012 | Schloegel | G06T 7/20 382/103 |
| 2012/0236757 | A1* | 9/2012 | Klein | H04L 41/12 370/255 |
| 2012/0294194 | A1* | 11/2012 | Balasubramanian | H04L 12/4641 370/256 |
| 2013/0246683 | A1* | 9/2013 | Natrajan | G06F 11/3051 710/316 |
| 2013/0346260 | A1* | 12/2013 | Jubran | G06Q 10/087 705/28 |
| 2014/0192677 | A1* | 7/2014 | Chew | H04L 69/14 370/254 |
| 2014/0310390 | A1* | 10/2014 | Sorenson, III | H04L 47/10 709/223 |
| 2015/0098388 | A1* | 4/2015 | Fang | H04B 17/318 370/328 |
| 2015/0207724 | A1* | 7/2015 | Choudhury | H04L 45/42 370/255 |
| 2015/0281068 | A1* | 10/2015 | Wang | H04L 12/4641 370/392 |
| 2016/0103911 | A1* | 4/2016 | Logue | F24F 11/30 707/695 |
| 2016/0373347 | A1* | 12/2016 | Kompella | H04L 45/02 |
| 2017/0257228 | A1* | 9/2017 | Chen | H04L 47/825 |
| 2017/0331733 | A1* | 11/2017 | Hooda | H04L 45/74 |
| 2018/0367302 | A1* | 12/2018 | Kondalam | H04L 9/0841 |
| 2019/0109783 | A1* | 4/2019 | Kommula | H04L 41/0668 |
| 2019/0116116 | A1* | 4/2019 | Przygienda | H04L 45/48 |
| 2019/0132209 | A1* | 5/2019 | Hooda | H04L 41/12 |
| 2019/0335526 | A1* | 10/2019 | Wittenschlaeger | H04B 7/18584 |
| 2019/0342215 | A1* | 11/2019 | Jain | H04L 45/742 |
| 2019/0363755 | A1* | 11/2019 | Aloush | H04B 3/544 |

* cited by examiner

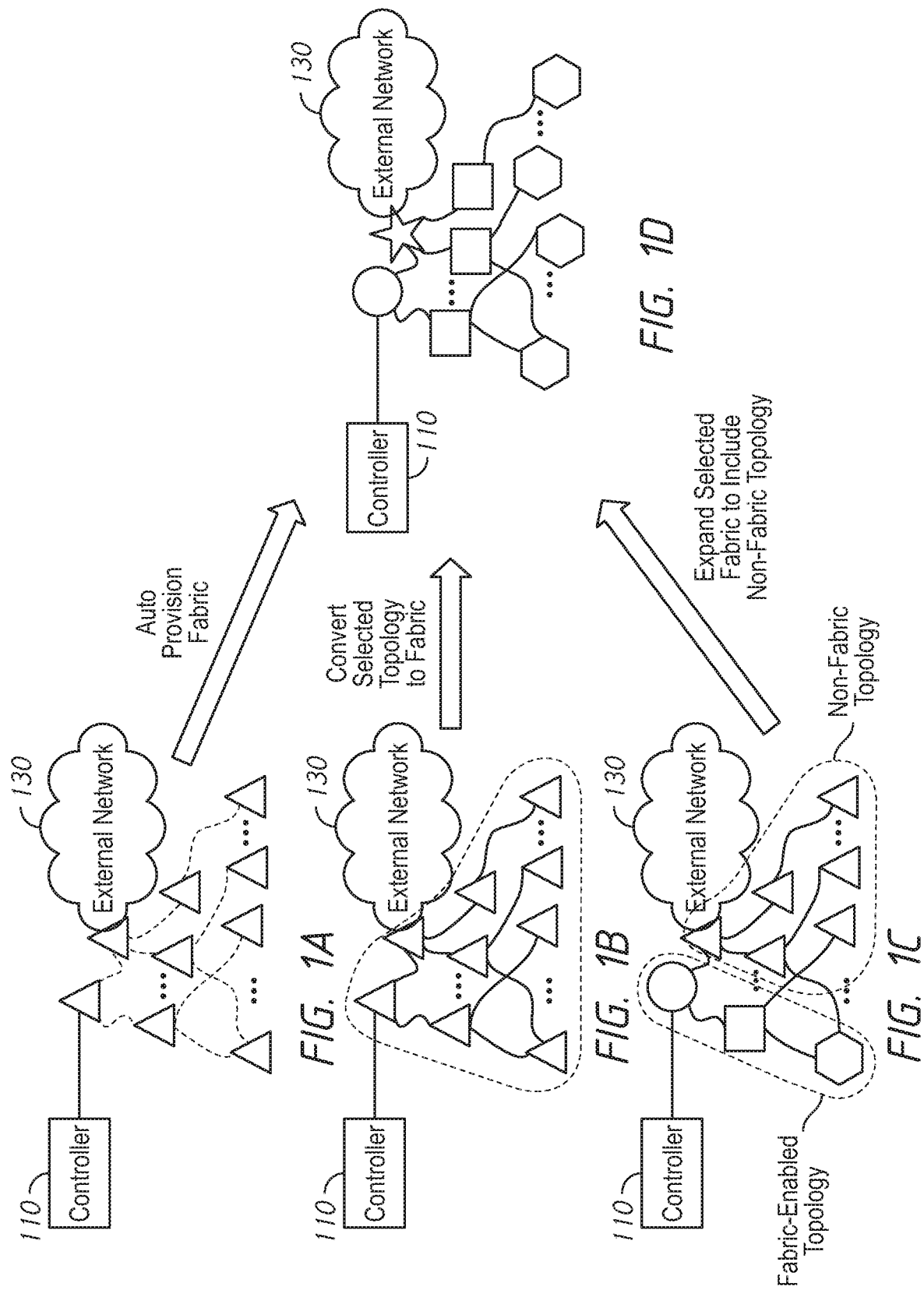

SYSTEMS AND METHODS FOR ENTERPRISE FABRIC CREATION

TECHNICAL FIELD

The present disclosure relates generally to a computer network, and more particularly, to enterprise fabric deployment.

BACKGROUND

Previously existing enterprise fabric deployment methods often involve a considerable amount of manual configuration. Further, these methods often use pre-deployment network information as ground truth for. As such, during enterprise fabric deployment, the pre-deployment network information may be out-of-date. Consequently, the amount of manual configuration of enterprise fabric components increases.

BRIEF DESCRIPTION OF THE DRAWINGS

So that the present disclosure can be understood by those of ordinary skill in the art, a more detailed description can be had by reference to aspects of some illustrative embodiments, some of which are shown in the accompanying drawings.

FIGS. 1A-1D illustrate various types of enterprise fabric deployment in accordance with some embodiments;

Figure 2A:
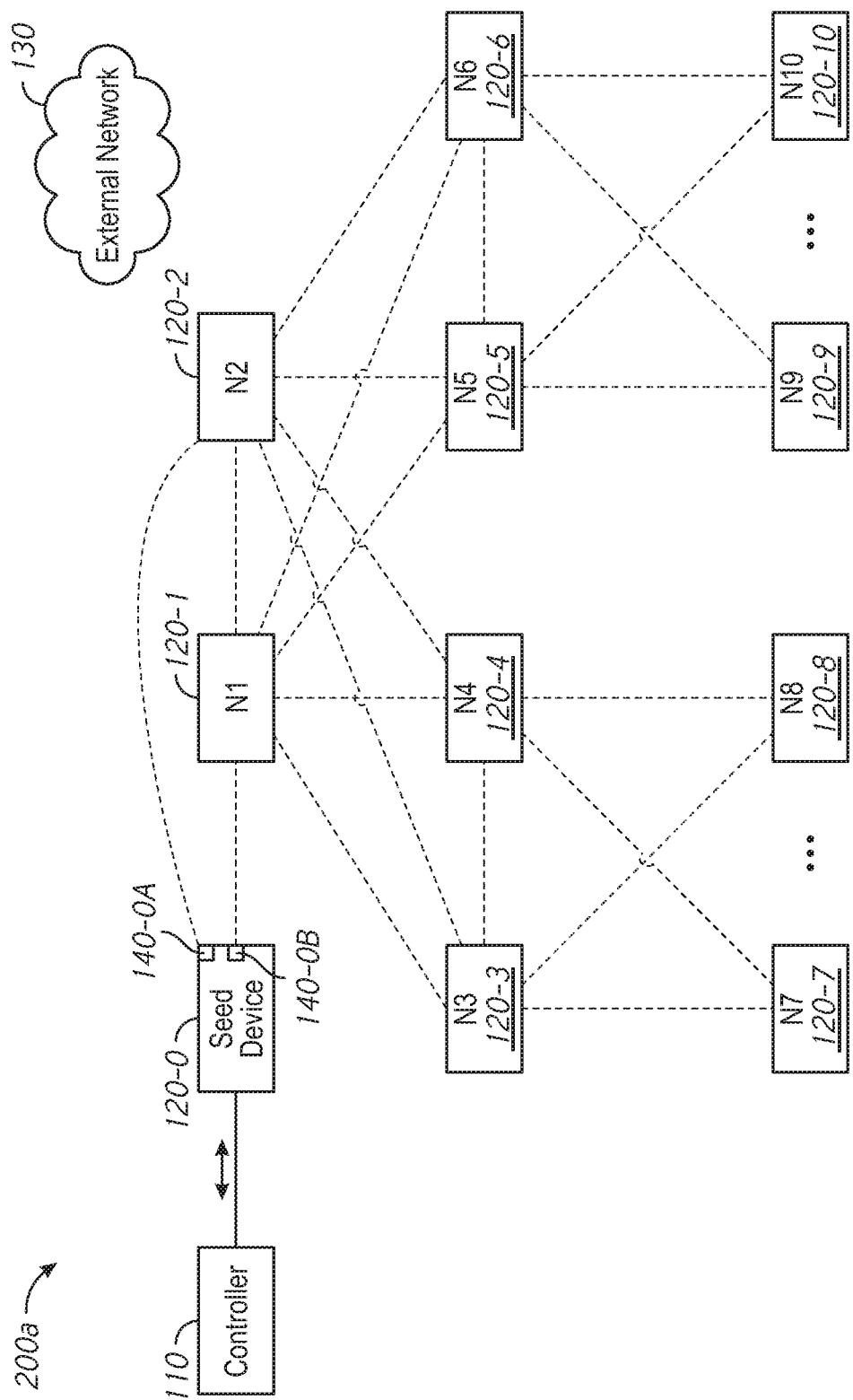
FIGS. 2A-2C illustrate connecting enterprise fabric components during enterprise fabric deployment in accordance with some embodiments.

In accordance with common practice the various features illustrated in the drawings cannot be drawn to scale. Accordingly, the dimensions of the various features can be arbitrarily expanded or reduced for clarity. In addition, some of the drawings cannot depict all of the components of a given system, method or device. Finally, like reference numerals can be used to denote like features throughout the specification and figures.

DESCRIPTION OF EXAMPLE EMBODIMENTS

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example embodiments described herein.

Overview

Systems and methods in accordance with embodiments described herein solve the aforementioned problems in enterprise fabric deployment. There is a demand to make enterprise fabric deployment simple, e.g., preferably with no keyboard involved. In accordance with systems and methods disclosed herein, the enterprise fabric can be deployed without relying on pre-deployment static configuration and with minimal manual configuration, thus simplifying the enterprise fabric deployment process. Typically, enterprise fabric deployment involves green field deployment and/or brown field deployment. In either type of enterprise fabric deployment, once a user initiates the deployment process, an enterprise fabric can be created automatically with components of the enterprise fabric configured dynamically in accordance with embodiments described herein.

For example, FIG. 1A illustrates an initiate state of an exemplary green field deployment. In FIG. 1A, a controller 110 connects to a device in a connectivity graph. As indicated by the dotted lines, the connectivity graph includes a plurality of connectable devices in a network topology. Once a user selects an auto-provision fabric option and indicates an initiation of the enterprise fabric deployment process, the connectivity graph is deployed to an enterprise fabric with components in the enterprise fabric created. The end result is shown in FIG. 1D, which has solid lines indicating established links between devices. Further shown in FIG. 1D, components in the enterprise fabric are configured as represented by different shapes indicating different fabric component properties (e.g., roles or configurations) of the devices in the enterprise fabric topology. For example, the circle may represent a node configured as fabric control plane, the squares may represent intermediate nodes, the hexagons may represent edge nodes, and the star may represent a border node connectable to an external network 130 (e.g., the Internet, an external site, or an extranet).

In another example, FIG. 1B illustrates an initiate state of an exemplary brown field deployment. As shown in FIG. 1B, in some brown field deployments, the user designates a particular network topology and selects converting the particular network topology including the devices in the particular network topology to fabric. The particular network topology is converted to an enterprise fabric automatically by systems and methods described herein with nodes in the designated network topology marked as border nodes, edge nodes, a fabric control plane, and intermediate nodes, as shown in FIG. 1D.

In yet another example, FIG. 1C illustrates an initiate state of another exemplary brown field deployment. As shown in FIG. 1C, in some brown field deployments, the user selects a fabric-enabled topology (e.g., a topology that has enterprise fabric components) and a non-fabric network topology (e.g., a network topology without enterprise fabric components). The user further selects an option to expand the fabric-enabled topology. In response to the fabric expansion selection, the fabric-enabled topology is expanded to include the non-fabric network topology with nodes in the expanded topology being configured to enterprise fabric components, as shown in FIG. 1D.

In accordance with various embodiments, a method is performed at a controller of a fabric, wherein the controller is connected to a first seed device in the fabric. The method includes obtaining a connectivity graph of the fabric including the first seed device. The method further includes causing the first seed device to send a first request to a first neighboring device in the connectivity graph via a first interface of the first seed device connectable to the first neighboring device. The method also includes assigning fabric component properties to the first neighboring device and the first seed device in the fabric based at least in part on a first message from the first seed device, wherein the first seed device generates the first message based at least in part on a first response from the first neighboring device received via the first interface. The method additionally includes converting the first neighboring device to a second seed device in the fabric.

Example Embodiments

FIG. 2A is an illustration of an exemplary network 200A before being configured to an enterprise fabric in accordance with some embodiments. The exemplary network 200A is one example of a suitable operating environment and is not intended to suggest any limitation as to the scope of use or functionality of the present disclosure. Thus, other environments and configurations can be employed without departing from the scope or spirit of the present disclosure.

In some embodiments, the network 200A includes the controller 110 and a plurality of devices 120, e.g., a seed device 120-0, device N1 120-1, N2 120-2, N3 120-3, N4 120-4, N5 120-5, N6 120-6, N7 120-7, N8 120-8, N9 120-9, N10 120-10 (collectively referred to as the devices 120 hereinafter) etc. In some embodiments, each of the devices 120 serves as a node in the network 200A. As such, the devices 120 are also referred to as the nodes 120 hereinafter. In some embodiments, the controller 110 is a software-defined networking (SDN) controller for enterprise fabric. In some embodiments, the controller 110 enables policy-based automation that simplifies the enterprise fabric control. In some embodiments, the seed device 120-0 is a starting point for the enterprise fabric creation process described herein. Though FIG. 1 illustrates the seed device 120-0 as one device, the seed device 120-0 can include a set of devices. In some embodiments, each of the devices 120, including the seed device 120-0, has stored network information, such as capacity and/or placement of each device 120. The network probing or discovery during the enterprise fabric creation can use such information to find other nodes in the network topology, e.g., neighboring nodes connected to the seed device 120-0, etc. Further, as will be described below with reference to FIG. 3, the enterprise fabric creation process in accordance with embodiments described herein can use the stored network information on the devices 120 to configure the devices 120 as enterprise fabric components.

For example, in the network 200A, the controller 110 is connected to the seed device 120-0, as indicated by the solid line. Through the connection (as indicated by the arrows), the controller 110 can query the seed device 120-0 and obtain a connectivity graph that the seed device 120-0 is part of. In the connectivity graph, the seed device 120-0 is connectable to the nodes N1 120-1 and N2 120-2, as indicated by the dotted lines. In other words, the nodes N1 120-1 and N2 120-2 can become neighboring nodes of the seed device 120-0 once connected to the seed device 120-0. Likewise, the node N1 120-1 is connectable to neighboring nodes N3 120-3 and N4 120-4; and the node N2 120-2 is connectable to neighboring nodes N5 120-5 and N6 120-6. Further, in the connectivity graph, the nodes N3 120-3 and N4 120-4 are connectable to a plurality of neighboring nodes, including N7 120-7 and N8 120-8; and the nodes N5 120-5 and N6 120-6 are connectable to a plurality of neighboring nodes, including N9 120-9 and N10 120-10.

In some embodiments, the user selects an auto-provision fabric policy, and initiates the enterprise fabric creation process. The automated enterprise fabric creation process starts with the controller 110 interrogating the seed device 120-0, e.g., querying the stored network information on the seed device 120-0 in order to learn its neighboring nodes, ARP cache, etc. After connecting the seed device 120-0 to the nodes N1 120-1 and N2 120-2, the controller 110 can then utilize links to the nodes N1 120-1 and N2 120-2 to find network information of their respective neighboring nodes in the network 200A. In other words, in accordance with embodiments described herein, using the seed device 120-0 as a starting point, the controller 110 can discover the nodes 120 that are directly and indirectly connected to the seed device 120-0 in the connectivity graph.

For instance, once connected to the seed device 120-0, the controller 110 performs enterprise fabric creation tasks, such as dividing subnets in the network 200A and/or registering subnets in a DHCP server for IP address allocation, etc. In some embodiments, the controller 110 also configures the seed device 120-0, including dynamically generating configuration settings (e.g., configurations for Plug and Play (PNP) bootstrap). In accordance with the configuration settings, the seed device 120-0 creates a switched virtual Interface (SVI) (not shown) or a Bridge Domain Interface (BDI) (not shown) and places the disabled interfaces 140-0A and 140-0B (collectively referred to hereinafter as the interfaces 140-0 or the ports 140-0) on the seed device 120-0 in the SVI or BDI. As such, the disabled interfaces 140-0A and 140-0B are included in a subnet associated with the SVI. As is known in the art, an SW is a virtual LAN (VLAN) of switch ports represented by one interface to a routing or bridging system. The SVI provides the Layer 3 processing for packets from switch ports (also referred to as switch interfaces) associated with the VLAN. The controller 110 then enables the interfaces 140-0A and 140-0B on the seed device 120-0. Once the interfaces 140-0A and 140-0B are enabled, the links from the seed device 120-0 to the nodes N1 120-1 and N2 120-2 are established. In some embodiments, a discovery process (e.g., Plug and Play (PNP) bootstrap) starts and the nodes N1 120-1 and N2 120-2 become part of the enterprise fabric topology, as shown in FIG. 1B.

Figure 2B:
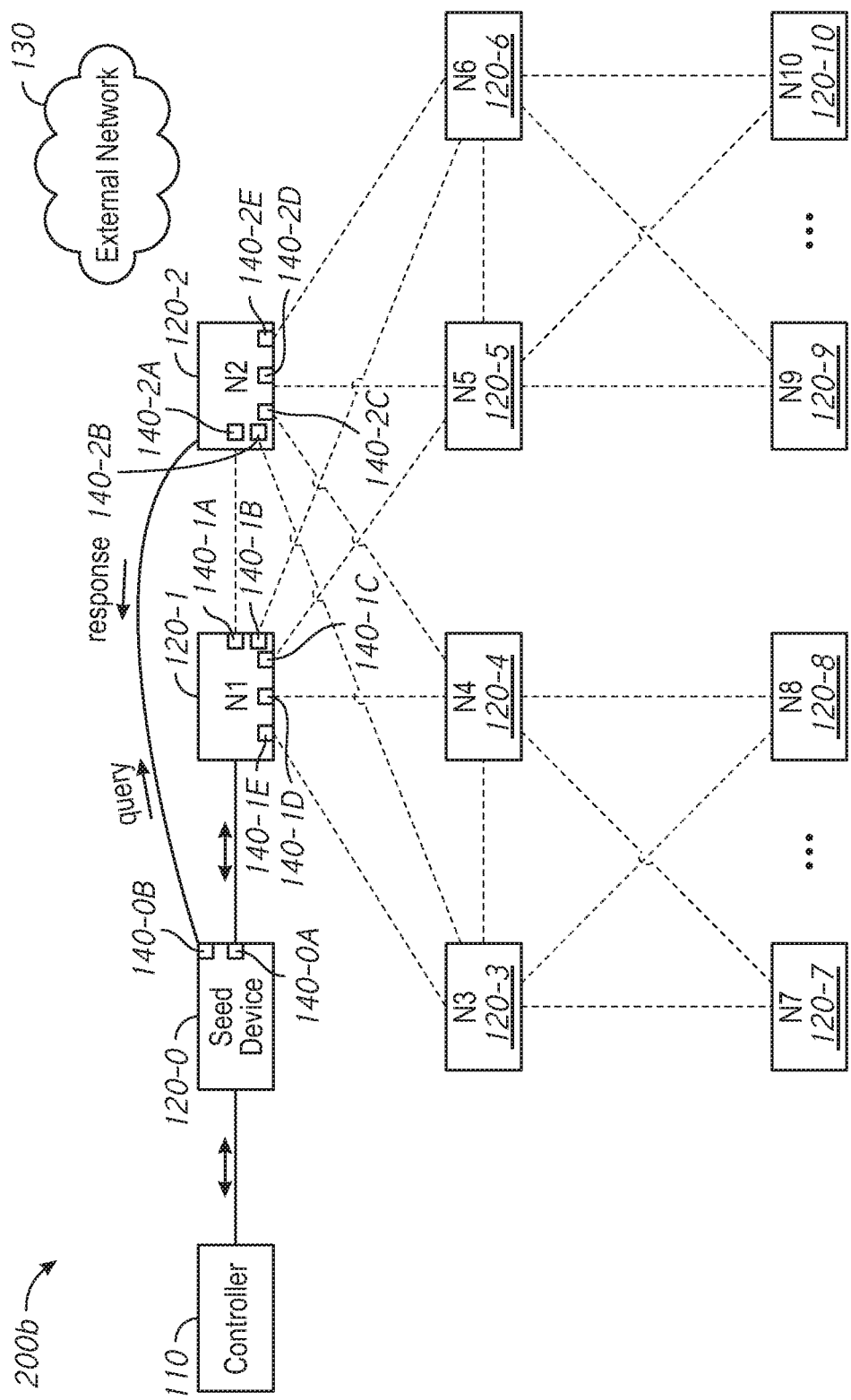

FIG. 2B is an illustration of an exemplary network 200B after including the nodes N1 120-1 and N2 120-2 in the enterprise fabric topology in accordance with some embodiments. As a result of enabling the interfaces 140-0A and 140-0B, the seed device 120-0 is connected to the nodes N1 120-1 and N2 120-2, as indicated by the solid lines. Once connected to the nodes N1 120-1 and N2 120-2, the controller 110 can further the automated enterprise fabric creation process by querying the stored network information on the nodes N1 120-1 and N2 120-2.

For instance, through the connections between the seed device 120-0 and the nodes N1 120-1 and N2 120-2, the PNP bootstrap process discovers neighboring devices of the seed device 120-0, i.e., the nodes N1 120-1 and N2 120-2. In some embodiments, the controller 110 configures the node N1 120-1, e.g., by dynamically generating configuration settings based on the network topology graph for the PNP process and putting disabled interfaces 140-1A, 140-1B, 140-1C, 140-1D, and 140-1E (collectively referred to as the interfaces 140-1) on the node N1 120-1 in the SVI. Likewise, the controller 110 also configures the node N2 120-2, e.g., by dynamically generating configuration settings based on the network topology graph for the PNP process and putting disabled interfaces 140-2A, 140-2B, 140-2C, 140-2D, and 140-2E (collectively referred to as the interfaces 140-2) on the node N2 120-2 in the SVI. In some embodiments, the controller 110 then enables the disabled ports in the SVI, e.g., enabling the interfaces 140-1 and 140-2. Once the interfaces 140-1 and 140-2 are enabled, in some embodiments, the discovery process (e.g., the PNP bootstrap) starts, and more neighboring nodes (e.g., the nodes N3 120-3, N4

Figure 2C:
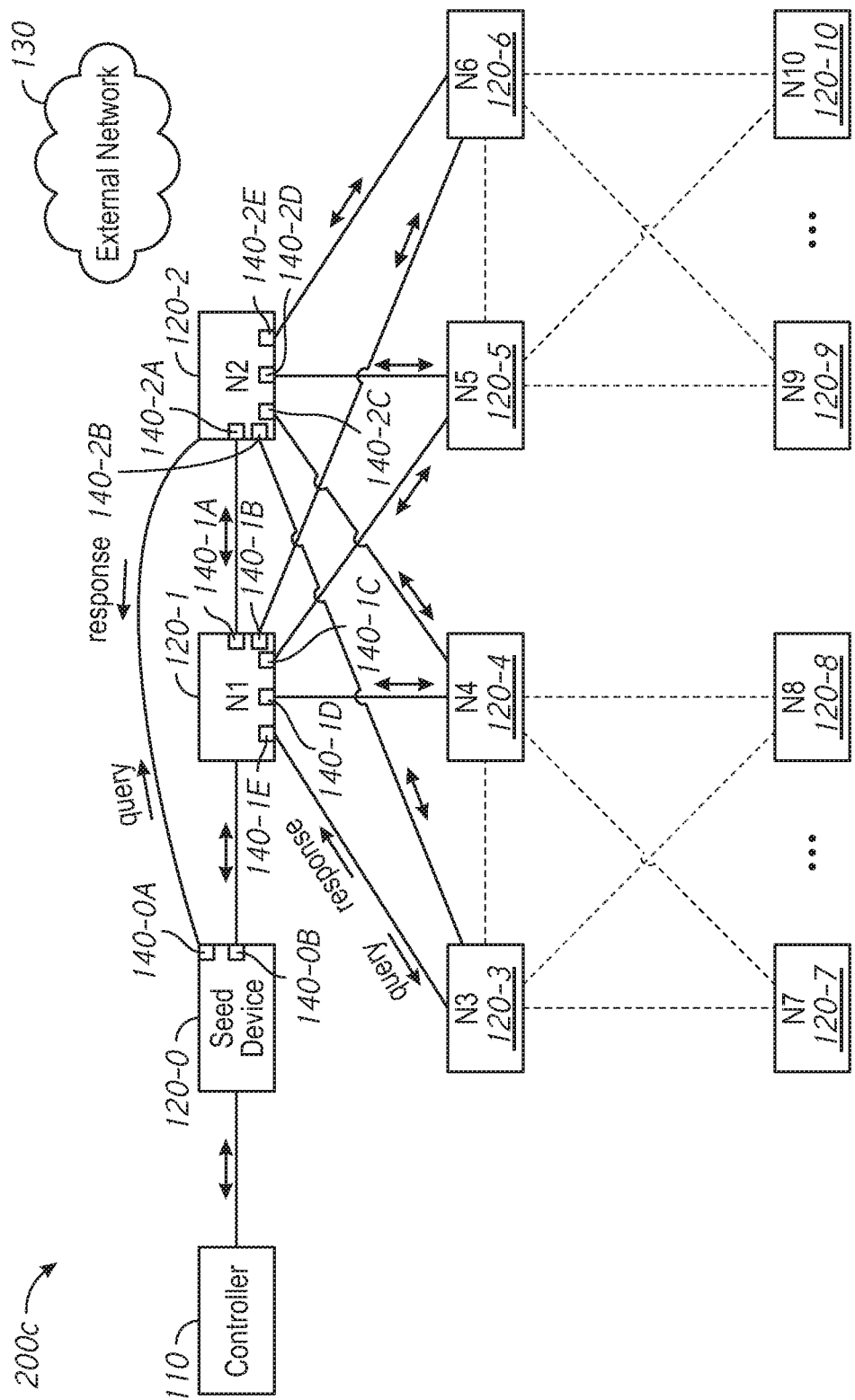

120-4, N5 120-5, and N6 120-6) are configured and become part of the enterprise fabric topology, as shown in FIG. 2C.

FIG. 2C is an illustration of an exemplary network 200C after including the nodes N3 120-3, N4 120-4, N5, 120-5, and N6 120-6 in the enterprise fabric topology in accordance with some embodiments. As a result of enabling the interfaces 140-1 and 140-2, the nodes N1 120-1 and N2 120-2 are connected to the nodes N3 120-3, N4 120-4, N5 120-5, and N6 120-6, as indicated by the solid lines. Once connected, the controller 110 can query the stored network information on the nodes N0 120-0 through N6 120-6 to further the automated enterprise fabric creation process. In some embodiments, the controller 110 recursively follows the processes described herein with reference to FIGS. 2A-2C, until nodes 120 in the network 200C are connected and become part of the enterprise fabric topology, as shown in FIG. 3.

Figure 3:
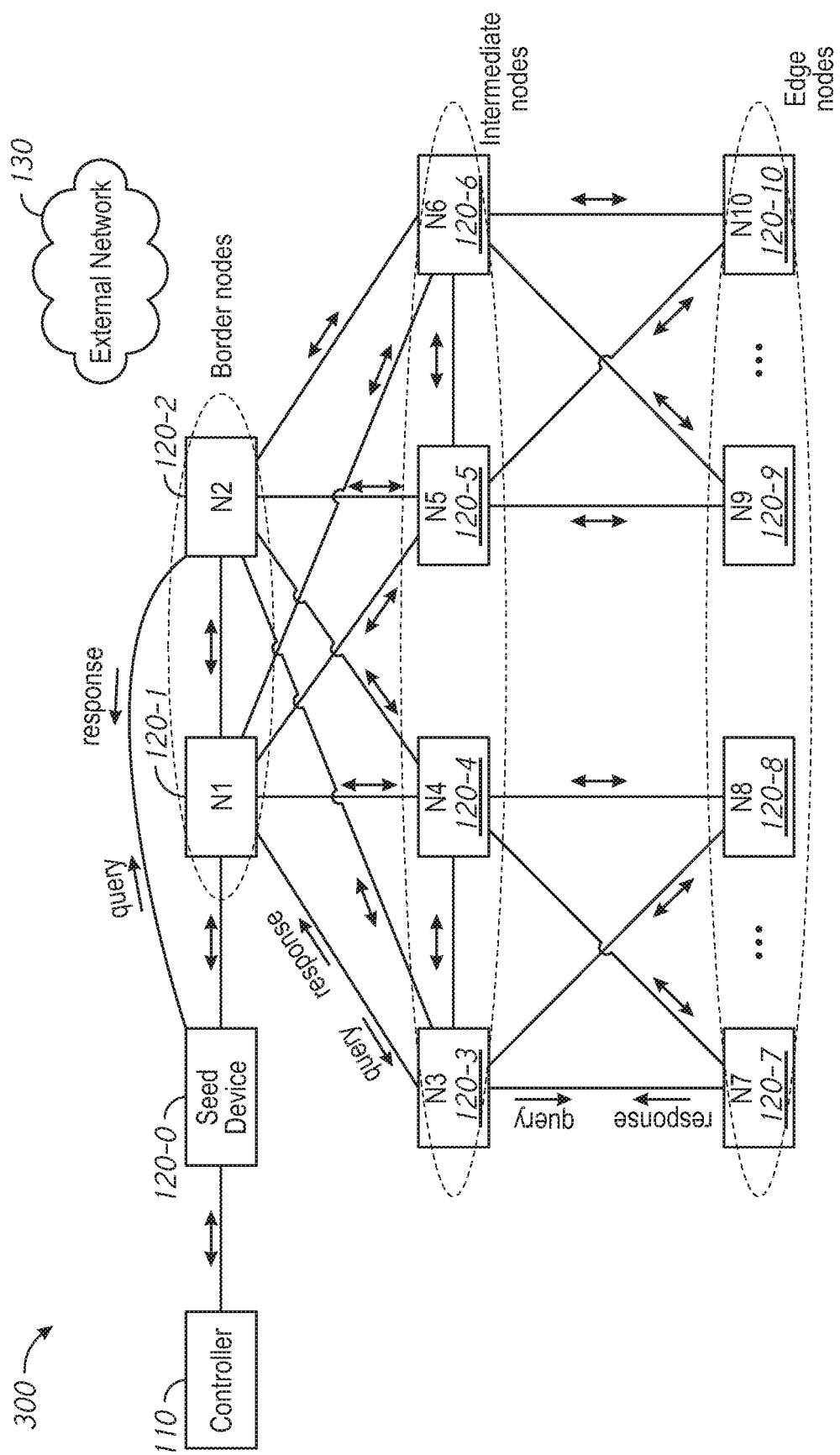
FIG. 3 illustrates configuring enterprise fabric components in accordance with some embodiments.

FIG. 3 is an illustration of an exemplary enterprise fabric 300 in accordance with some embodiments. Furthering the configuration shown in FIG. 2C, the controller 110 also assigns fabric component properties to the nodes 120. In some embodiments, fabric component properties such as roles of the nodes 120 in the enterprise fabric include a fabric control plane, border node, intermediate node, and edge node, among others. In some embodiments, the controller 110 queries the network information stored on the nodes 120 and obtains real-time network information from the nodes 120, e.g., real-time bandwidth allocation, number of hops, packet processing speed, etc. Based on the real-time network information and the network topology graph, the controller 110 assigns various fabric component properties to the nodes 120. In some embodiments, the fabric component property assignment process starts with the controller 110 locating one or more nodes among the nodes 120 that can be assigned as fabric control plane. This process can lead to finding nodes assigned to other fabric component properties. Further, based on policies, the controller 110 uses various criteria specified in the policies to determine which fabric component properties are assigned to which node 120.

For example, the controller 110 analyzes the placement of the nodes 120 by obtaining the number of hops to the controller 110, the number of hops to the external network 130, the number of hops to a host or a user equipment, etc. In some embodiments, based at least in part on the placements and on policies specifying that switches and routers connected to other switches and routers in the enterprise fabric are intermediate nodes, the controller 110 marks nodes N3 120-3, N4 120-4, N5 120-5, and N6 120-6 as the intermediate nodes. In some embodiments, based at least in part on the placements and on policies specifying that nodes connected to other routers or switches over a layer-3 network or an external site (e.g., the external network 130), the controller 110 marks the nodes N1 120-1 and N2 120-2 as border nodes. In some embodiments, based at least in part on the placement and on the policies specifying that nodes do not have children are edge nodes, the controller 110 assigns the nodes N7 120-7, N8 120-8, N9 120-9, and N10 120-10 as edge nodes. The edge nodes connect hosts or user equipment to the enterprise fabric 300.

In some embodiments, the controller 110 also analyzes the device capabilities and applies policies in order to determine the fabric component property assignment. For instance, when the number of nodes a device can serve exceeds a threshold value, applying policies, the controller 110 can assign the device as the fabric control plane. In another example, when a device can serve other nodes faster than a threshold speed, applying policies, the controller 110 can assign the device as the fabric control plane. In yet another example, when the real-time available bandwidth on the device exceeds a threshold value, applying policies, the controller 110 can assign the device as the fabric control plane. In the exemplary enterprise fabric 300, the controller labels the seed device 120-0 as the fabric control plane based at least in part on capacities of the seed device 120-0 and/or the placement of the seed device 120-0 being close the controller 110.

It should be noted that in some embodiments, the fabric component property assignment is performed after including the nodes 120 in the enterprise fabric topology. In some embodiments, the fabric component property assignment is performed simultaneously with the process of connecting the nodes 120 in the enterprise fabric topology. In such embodiments, the fabric component property assignment is performed recursively. For example, after discovering more nodes 120 in the enterprise fabric topology, a node, which was labeled and configured as an edge node, can be re-classified and/or re-configured as an intermediate node.

Figure 4:
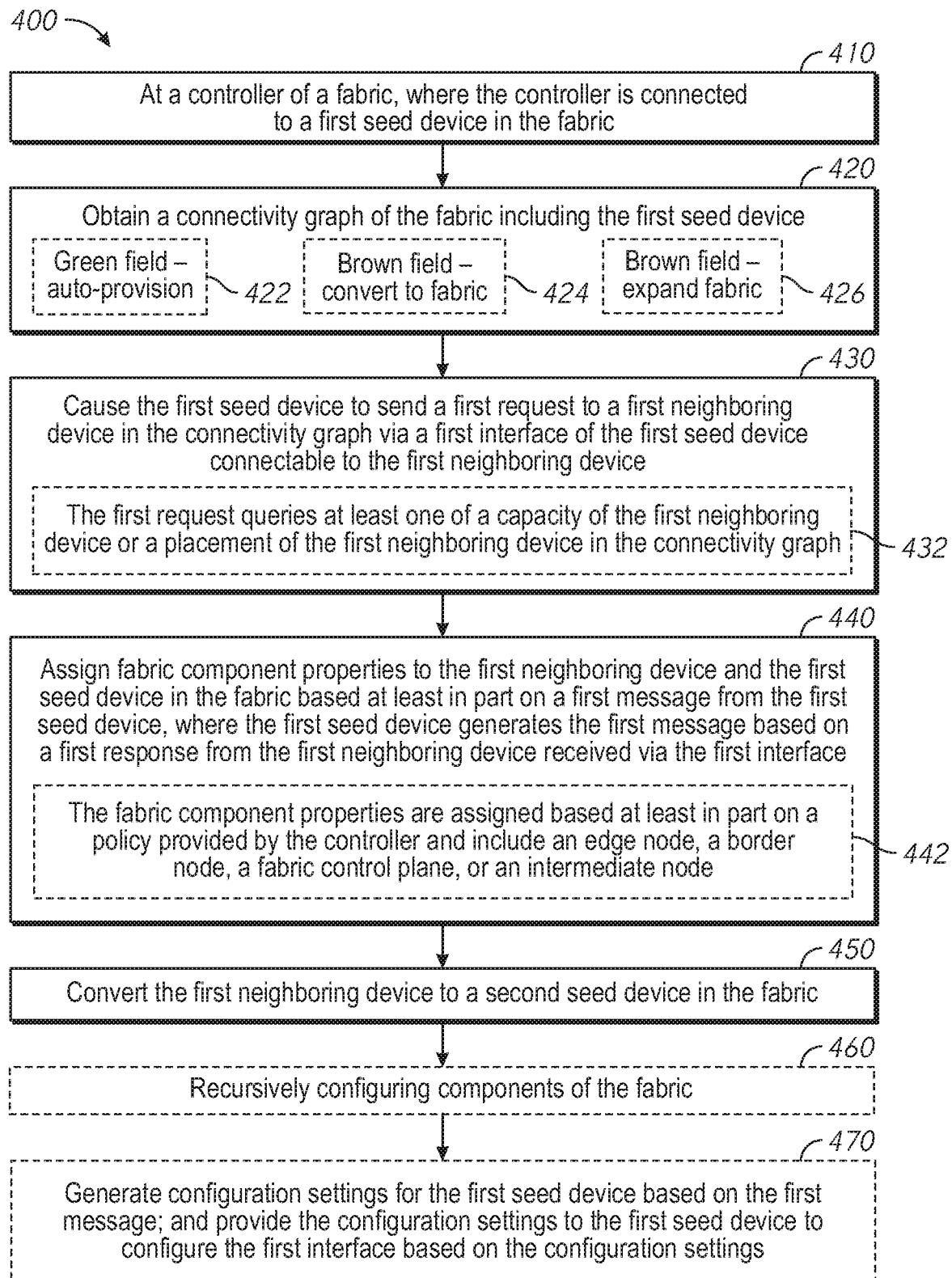
FIG. 4 is a flowchart illustrating a method of creating enterprise fabric in accordance with some embodiments.

FIG. 4 is a flowchart illustrating a method 400 of enterprise fabric creation in accordance with some embodiments. In some embodiments, as represented by block 410, the method 400 is performed at a controller of a fabric (e.g., the controller 110 in FIGS. 1A-1D, 2A-2C, and 3). Further as represented by block 410, in some embodiments, the controller is connected to a seed device in the fabric (e.g., the seed device 120-0 in FIGS. 1A-1D, 2A-2C, and 3). It should be noted that though FIGS. 1A-1D, 2A-2C, and 3 illustrate the controller 110 as one hop away from the seed device 120-0, the controller can be a single hop or multiple hops away from the seed device. In some embodiments, the method 400 is performed by processing logic, including hardware, firmware, software, or a combination thereof. In some embodiments, the method 400 is performed by one or more processors, one or more controllers, and/or one or more circuitries executing codes stored in a non-transitory computer-readable medium (e.g., a non-transitory memory).

The method 400 includes, as represented by block 420, obtaining a connectivity graph of the fabric including the first seed device. In some embodiments, as represented by block 422, in green field deployment embodiment of the method 400, obtaining the connectivity graph of the fabric includes configuring the first seed device to become part of a subnet, including placing the first interface on the first seed device into the subnet; and enabling the first interface in order to obtain links to the first seed device in the connectivity graph. In such embodiments, the first request is sent upon detecting the enabling of the first interface in accordance with some embodiments. Further, in some embodiments, the subnet is assigned to a virtual LAN.

For example, in FIGS. 2A and 2B, in order to obtain the connectivity graph, the controller 110 configures the seed device 120-0, so that the seed device 120-0 is connected to the nodes N1 120-1 and N2 120-2 in the topology. The controller 110 configures the seed device 120-0 by placing the interfaces 140-0A and 140-0B in a subnet (not shown), e.g., a virtual LAN such as an SVI, and enabling the interfaces 140-0A and 140-0B. Once enabled, the controller 110 can query the nodes N1 120-1 and N2 120-2 via the seed device 120-0 and obtain further information about the connectivity graph.

In some embodiments, as represented by block 424, in brown field deployment embodiment of the method 400, obtaining the connectivity graph of the fabric includes receiving an indication from a user to convert a network topology to the fabric; and in response to receiving the indication, deriving the connectivity graph from the network topology including identifying the first seed device from the network topology. For example, as shown in FIGS. 1B and 1D, once the controller 110 receives an indication from the user to convert the selected network topology, the controller 110 derives the connectivity graph from the selected network topology. Further, in some embodiments, the controller 110 selects one of the nodes from the selected network topology as a starting point, e.g., the seed device, in order to initiate the enterprise fabric creation process.

In some embodiments, as represented by block 426, in another brown field deployment embodiment of the method 400, obtaining the connectivity graph of the fabric includes obtaining a first network topology corresponding to a portion of the fabric and a second network topology; receiving an indication to expand a sub-fabric represented by a first network topology; and in response to receiving the indication, combining the first network topology and the second network topology as the connectivity graph. For example, as shown in FIGS. 1C and 1D, the user selects the fabric-enabled topology and the non-fabric topology. Once the controller 110 receives an indication from the user to expand the fabric-enabled topology, the controller 110 combines the fabric-enabled topology and the non-fabric enabled topology to generate the expanded enterprise fabric.

In some embodiments, as represented by block 430, the method 400 includes causing the first seed device to send a first request to a first neighboring device in the connectivity graph via a first interface of the first seed device connectable to the first neighboring device. In such embodiments, as represented by block 432, the first request queries at least one of a capacity of the first neighboring device or a placement of the first neighboring device in the connectivity graph in accordance with some embodiments. For example, in FIG. 2B, the controller 110 causes the seed device 120-0 to send a request to the node N1 120-1 via the interface 140-0A and send a request to the node N2 120-2 via the interface 140-0B. These requests query the nodes N1 120-1 and N2 120-2 in order to obtain network information stored on the nodes N1 120-1 and N2 120-2, such as the capacities and/or placements of the nodes N1 120-1.

In some embodiments, as represented by block 440, the method 400 includes assigning fabric component properties to the first neighboring device and the first seed device in the fabric based at least in part on a first message from the first seed device, where the first seed device generates the first message based at least in part on a first response from the first neighboring device received via the first interface. For example, in FIG. 2B, the nodes N1 120-1 and N2 120-2 respond to the respective query with network information. Upon receiving the responses, the seed device 120-0 forwards the network information to the controller 110 in one or more messages. Having obtained the network information, the controller 110 can then assign fabric component properties to the newly discovered nodes N1 120-1 and N2 120-2. In some embodiments, as represented by block 442, the fabric component properties are assigned based at least in part on a policy provided by the controller and include an edge node, a border node, a fabric control plane, or an intermediate node.

For example, in FIG. 3, the controller 110 constructs the enterprise fabric topology based on the messages received from the nodes 120 and assigns the roles to the nodes 120 to complete the enterprise fabric components creation. In the enterprise fabric topology shown in FIG. 3, the node 120-0 is assigned as the fabric control plane based at least in part on its placement and/or capacity satisfies criteria specified in a policy associated fabric control plane.

The method 400 continues, as represented by block 450, with the controller converting the first neighboring device to a second seed device in the fabric. For example, in FIG. 2B, once the node N1 120-1 becomes a component in the enterprise fabric, the controller 110 converts the node N1 120-1 to a seed device in order to discover its neighboring nodes N3 120-3 and N4 120-4. In other words, the enterprise fabric creation process is a recursive process, as represented by block 460 in accordance with some embodiments. As such, in some embodiments, the method 400 further includes causing the second seed device to send a second request to a second neighboring device in the connectivity graph via a second interface of the second seed device connectable to the second neighboring device; assigning a role to the second neighboring device based at least in part on a second message from the second seed device, wherein the second seed device generates the second message based at least in part on a second response from the second neighboring device; and converting the second neighboring device to a third seed device in the fabric. Further, in some embodiments, the method 400 further includes updating the roles based on the second message.

For example, having converted the nodes N1 120-1 and N2 120-2 to seed devices, the controller 110 can utilize the links to the nodes N1 120-1 and N2 120-2 to request network information from their respective neighboring nodes N3 120-3, N4 120-4, N5 120-5, and N6 120-6, as shown in FIG. 2C. The controller 110 can further assign roles to these neighboring nodes N3 120-3, N4 120-4, N5 120-5, and N6 120-6 and/or update roles already assigned to nodes 120-0 through 120-2 according to new network information. Having configured the nodes 120-0 through 120-6, the controller 110 can then convert the newly discovered nodes N3 120-3, N4 120-4, N5 120-5, and N6 120-6 to seed devices and utilize these seed devices to discover their respective neighboring nodes.

Still referring to FIG. 4, in some embodiments, as represented by block 470, the method 400 further includes generating configuration settings for the first seed device based on the first message; and providing the configuration settings to the first seed device to configure the first interface based on the configuration settings. In other words, the enterprise fabric creation process described herein is dynamic Relative to previously existing methods of relying on static pre-deployment configuration, the configuration for each component in the enterprise fabric can be generated on the fly and based on real-time network information. As such, the enterprise fabric creation process disclosed herein reduces the amount of manual configuration and improves the accuracy of enterprise fabric deployment.

Figure 5:
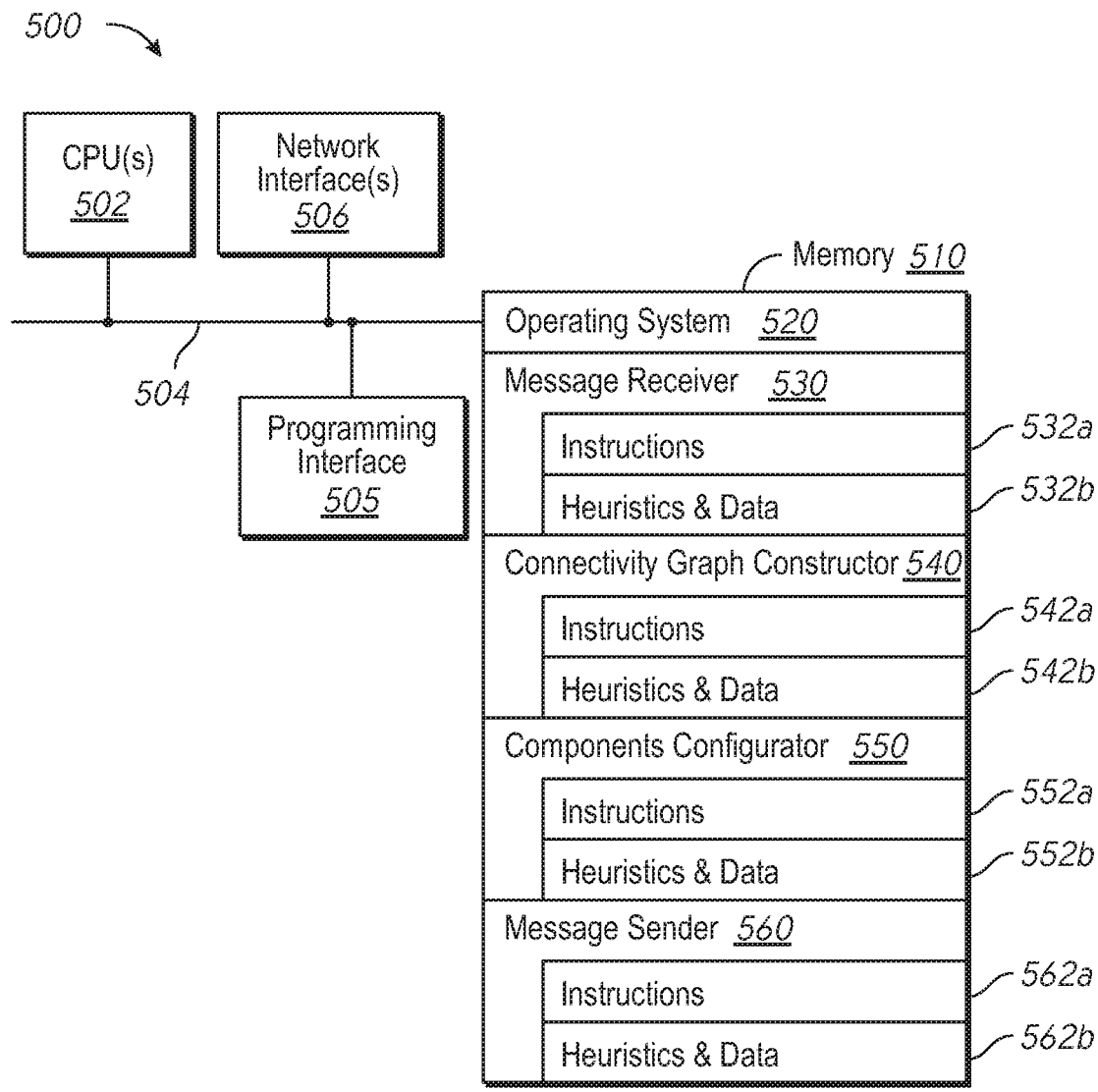
FIG. 5 is a block diagram of a networking device in accordance with some embodiments.

FIG. 5 is a block diagram of a computing device 500 in accordance with some embodiments. In some embodiments, the computing device 500 corresponds to the controller 110 in FIGS. 1A-1D, 2A-2C, and 3, and performs one or more of the functionalities described above. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the networking device 500 includes one or more processing units (CPUs) 502 (e.g., processors), one or more network interfaces 506, a memory 510, a programming interface 505, and one or more communication buses 504 for interconnecting these and various other components.

In some embodiments, the one or more communication buses 504 include circuitry that interconnects and controls communications between system components. The memory 510 includes high-speed random access memory, such as DRAM, SRAM, DDR RAM or other random access solid state memory devices; and, in some embodiments, include non-volatile memory, such as one or more magnetic disk storage devices, optical disk storage devices, flash memory devices, or other non-volatile solid state storage devices. The memory 510 optionally includes one or more storage devices remotely located from the one or more CPUs. The memory 510 comprises a non-transitory computer readable storage medium. Moreover, in some embodiments, the memory 510 or the non-transitory computer readable storage medium of the memory 510 stores the following programs, modules and data structures, or a subset thereof including an optional operating system 520, a message receiver 530, a connectivity graph constructor 540, a component configurator 550, and a message sender 560. In some embodiments, one or more instructions are included in a combination of logic and non-transitory memory. The operating system 520 includes procedures for handling various basic system services and for performing hardware dependent tasks.

In some embodiments, the message receiver 530 is configured to receive a message (e.g., receiving the network information from the seed device 120-0, FIGS. 2A-2C and 3) over the one or more network interfaces 506. To that end, the message receiver 530 includes a set of instructions 532a and heuristics and data 532b.

In some embodiments, the connectivity graph constructor 540 (e.g., part of the controller 110) is configured to that obtains the connectivity graph based on messages received through the message receiver 530 as in the green field deployment shown in FIGS. 2A-2C or obtains the connectivity graph based on user specification as in the brown field deployment shown in FIGS. 1B-1D. To that end, the connectivity graph constructor 540 includes a set of instructions 542a and heuristics and data 542b.

In some embodiments, the component configurator 550 (e.g., part of the controller 110) is configured to configure the enterprise fabric components, including assigning roles to each component. To that end, the component configurator 550 includes a set of instructions 552a and heuristics and data 552b.

In some embodiments, the message sender 560 is configured to transmit a message (e.g., sending instructions to nodes 120) over the one or more network interfaces 506. To that end, the message sender 560 includes a set of instructions 562a and heuristics and data 562b.

Although the message receiver 530, the connectivity graph constructor 540, the component configurator 550, and the message sender 560 are illustrated as residing on a single networking device 500, it should be understood that in other embodiments, any combination of the message receiver 530, the connectivity graph constructor 540, the component configurator 550, and the message sender 560 are illustrated as residing on a single networking device 500 can reside in separate computing devices in various embodiments. For example, in some embodiments, each of the message receiver 530, the connectivity graph constructor 540, the component configurator 550, and the message sender 560 illustrated as residing on a single networking device 500 resides on a separate computing device.

Moreover, FIG. 5 is intended more as a functional description of the various features that are present in a particular embodiment as opposed to a structural schematic of the embodiments described herein. As recognized by those of ordinary skill in the art, items shown separately could be combined and some items could be separated. For example, some functional modules shown separately in FIG. 6 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

Note that the components and techniques shown and described in relation to the separate figures can indeed be provided as separate components and techniques, and alternatively one or more (or all of) the components and techniques shown and described in relation to the separate figures are provided together for operation in a cooperative manner.

While various aspects of embodiments within the scope of the appended claims are described above, it should be apparent that the various features of embodiments described above can be embodied in a wide variety of forms and that any specific structure and/or function described above is merely illustrative. Based on the present disclosure one skilled in the art should appreciate that an aspect described herein can be implemented independently of any other aspects and that two or more of these aspects can be combined in various ways. For example, an apparatus can be implemented and/or a method can be practiced using any number of the aspects set forth herein. In addition, such an apparatus can be implemented and/or such a method can be practiced using other structure and/or functionality in addition to or other than one or more of the aspects set forth herein.

It will also be understood that, although the terms "first," "second," etc. can be used herein to describe various elements, these elements should not be limited by these terms. These terms are only used to distinguish one element from another. For example, a first spine switch could be termed a second spine switch, and, similarly, a second spine switch could be termed a first spine switch, which changing the meaning of the description, so long as all occurrences of the "first spine switch" are renamed consistently and all occurrences of the second spine switch are renamed consistently. The first spine switch and the second spine switch are both spine switches, but they are not the same spine switch.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The invention claimed is:

1. A method for automatically creating a fabric, the method comprising:
    obtaining, by a controller, a connectivity graph of the fabric from a first seed device, wherein the connectivity graph of the fabric comprises a first seed device and a plurality of neighboring devices;
    causing the first seed device to send a first request to a first neighboring device in the connectivity graph via a first interface of the first seed device, wherein the first neighboring device is one of the plurality of neighboring devices, wherein the first interface is connectable to the first neighboring device, wherein causing the first seed device to send the first request to the first neighboring device in the connectivity graph via the first interface comprises:
        disabling the first interface of the first seed device,
        creating a subnet comprising at least one of the following: a switched virtual interface and a bridge domain interface,
        placing the disabled first interface of the first seed device in the subnet comprising at least one of the following: the switched virtual interface and the bridge domain interface,
        enabling, upon placing the disabled first interface in the subnet, the disabled first interface of the first seed device, wherein enabling the disabled first interface further comprises:
            enabling a link between the first seed device and the first neighboring device through the first interface, and
            configuring a plug and play bootstrap in the first seed device, wherein the plug and play bootstrap causing the first seed device to send the first request to the first neighboring device in the connectivity graph via the first interface;
    assigning fabric component properties to the first neighboring device and the first seed device in the fabric based at least in part on a first message from the first seed device, wherein the first seed device generates the first message based on a first response from the first neighboring device received via the first interface; and
    converting the first neighboring device to a second seed device in the fabric.

2. The method of claim 1, wherein the first request is sent upon detecting the enabling of the first interface.

3. The method of claim 1, wherein the subnet is assigned to a virtual LAN.

4. The method of claim 1, wherein obtaining the connectivity graph of the fabric includes:
    receiving an indication from a user to convert a network topology to the fabric; and
    in response to receiving the indication, deriving the connectivity graph from the network topology including identifying the first seed device from the network topology.

5. The method of claim 1, wherein obtaining the connectivity graph of the fabric includes:
    obtaining a first network topology corresponding to a portion of the fabric and a second network topology;
    receiving an indication to expand a sub-fabric represented by the first network topology; and
    in response to receiving the indication, combining the first network topology and the second network topology as the connectivity graph.

6. The method of claim 1, wherein the first request queries at least one of a capacity of the first neighboring device or a placement of the first neighboring device in the connectivity graph.

7. The method of claim 1, wherein the fabric component properties are assigned based at least in part on a policy provided by the controller and include an edge node, a border node, a fabric control plane, or an intermediate node.

8. The method of claim 1, further comprising:
    causing the second seed device to send a second request to a second neighboring device, wherein the second neighboring device is one of the plurality of the neighboring devices, wherein the second request is sent via a second interface of the second seed device connectable to the second neighboring device;
    assigning a fabric component property to the second neighboring device based at least in part on a second message from the second seed device, wherein the second seed device generates the second message based at least in part on a second response from the second neighboring device; and
    converting the second neighboring device to a third seed device in the fabric.

9. The method of claim 8, further comprising updating the fabric component properties assigned to the first seed device and the first neighboring device based on the second message.

10. The method of claim 1, further comprising:
    generating configuration settings for the first seed device based on the first message; and
    providing the configuration settings to the first seed device to configure the first interface based on the configuration settings.

11. A controller for automatically creating a fabric, the controller comprising:
    a memory; and
    a processor connected to the memory, wherein the processor is operative to:
        obtain a connectivity graph of the fabric from a first seed device, wherein the connectivity graph of the fabric comprises a first seed device and a plurality of neighboring devices;
        cause the first seed device to send a first request to a first neighboring device in the connectivity graph via a first interface of the first seed device, wherein the first neighboring device is one of the plurality of neighboring devices, the first interface being connectable to the first neighboring device, wherein the processor being operative to cause the first seed device to send the first request to the first neighboring device in the connectivity graph via the first interface comprises the processor being operative to:
            disable the first interface of the first seed device,
            create a subnet comprising at least one of the following: a switched virtual interface and a bridge domain interface,
            place the disabled first interface of the first seed device in the subnet comprising at least one of the following: the switched virtual interface and the bridge domain interface,
            enable, after placing in the subnet, the disabled first interface of the first seed device, wherein the processor being operative to enable the disabled first interface further comprises the processor being operative to:
   enable a link between the first seed device and the first neighboring device through the first interface, and
   configure a plug and play bootstrap in the first seed device,
   wherein the plug and play bootstrap causes, the first seed device to send the first request to the first neighboring device in the connectivity graph via the first interface;
assign fabric component properties to the first neighboring device and the first seed device in the fabric based at least in part on a first message from the first seed device, wherein the first seed device generates the first message based on a first response from the first neighboring device received via the first interface; and
convert the first neighboring device to a second seed device in the fabric.

12. The controller of claim 11, wherein obtaining the connectivity graph of the fabric includes:
receiving an indication from a user to convert a network topology to the fabric; and
in response to receiving the indication, deriving the connectivity graph from the network topology including identifying the first seed device from the network topology.

13. The controller of claim 11, wherein obtaining the connectivity graph of the fabric includes:
obtaining a first network topology corresponding to a portion of the fabric and a second network topology;
receiving an indication to expand a sub-fabric represented by the first network topology; and
in response to receiving the indication, combining the first network topology and the second network topology as the connectivity graph.

14. The controller of claim 11, wherein the first request queries at least one of a capacity of the first neighboring device or a placement of the first neighboring device in the connectivity graph.

15. The controller of claim 11, wherein the fabric component properties are assigned based at least in part on a policy provided by the controller and include an edge node, a border node, a fabric control plane, or an intermediate node.

16. The controller of claim 11, wherein the one or more programs further cause the device to:
cause the second seed device to send a second request to a second neighboring device, wherein the second neighboring device is one of the plurality of the neighboring devices, wherein the second request is sent via a second interface of the second seed device connectable to the second neighboring device;
assign a fabric component property to the second neighboring device based at least in part on a second message from the second seed device, wherein the second seed device generates the second message based at least in part on a second response from the second neighboring device; and
convert the second neighboring device to a third seed device in the fabric.

17. The controller of claim 16, wherein the one or more programs further cause the controller to update the fabric component properties assigned to the first seed device and the first neighboring device based on the second message.

18. The controller of claim 11, wherein the one or more programs further cause the controller to:
generate configuration settings for the first seed device based on the first message; and
provide the configuration settings to the first seed device to configure the first interface based on the configuration settings.

19. A non-transitory computer readable medium having instructions which when executed perform a method for automatically creating a fabric, the method comprising:
obtaining, by a controller, a connectivity graph of the fabric from a first seed device, wherein the connectivity graph of the fabric comprises a first seed device and a plurality of neighboring devices;
causing the first seed device to send a first request to a first neighboring device in the connectivity graph via a first interface of the first seed device, wherein the first neighboring device is one of the plurality of neighboring devices, wherein the first interface is connectable to the first neighboring device, wherein causing the first seed device to send the first request to the first neighboring device in the connectivity graph via the first interface comprises:
   disabling the first interface of the first seed device,
   creating a subnet comprising at least one of the following: a switched virtual interface and a bridge domain interface,
   placing the disabled first interface of the first seed device in the subnet comprising at least one of the following: the switched virtual interface and the bridge domain interface,
   enabling, upon placing, the disabled first interface of the first seed device, wherein enabling the disabled first interface further comprises:
      enabling a link between the first seed device and the first neighboring device through the first interface, and
      configuring a plug and play bootstrap in the first seed device, wherein the plug and play bootstrap causing, upon enabling, the first seed device to send the first request to the first neighboring device in the connectivity graph via the first interface;
assigning fabric component properties to the first neighboring device and the first seed device in the fabric based at least in part on a first message from the first seed device, wherein the first seed device generates the first message based on a first response from the first neighboring device received via the first interface; and
converting the first neighboring device to a second seed device in the fabric.

20. The non-transitory computer readable medium of claim 19, wherein obtaining the connectivity graph of the fabric comprises:
obtaining a first network topology corresponding to a portion of the fabric and a second network topology;
receiving an indication to expand a sub-fabric represented by the first network topology; and
in response to receiving the indication, combining the first network topology and the second network topology as the connectivity graph.

* * * * *